Oct. 2, 1951     R. A. BECKWITH     2,569,445
BRAKE CONTROL MECHANISM FOR CRANE TYPE VEHICLES
Filed June 21, 1948
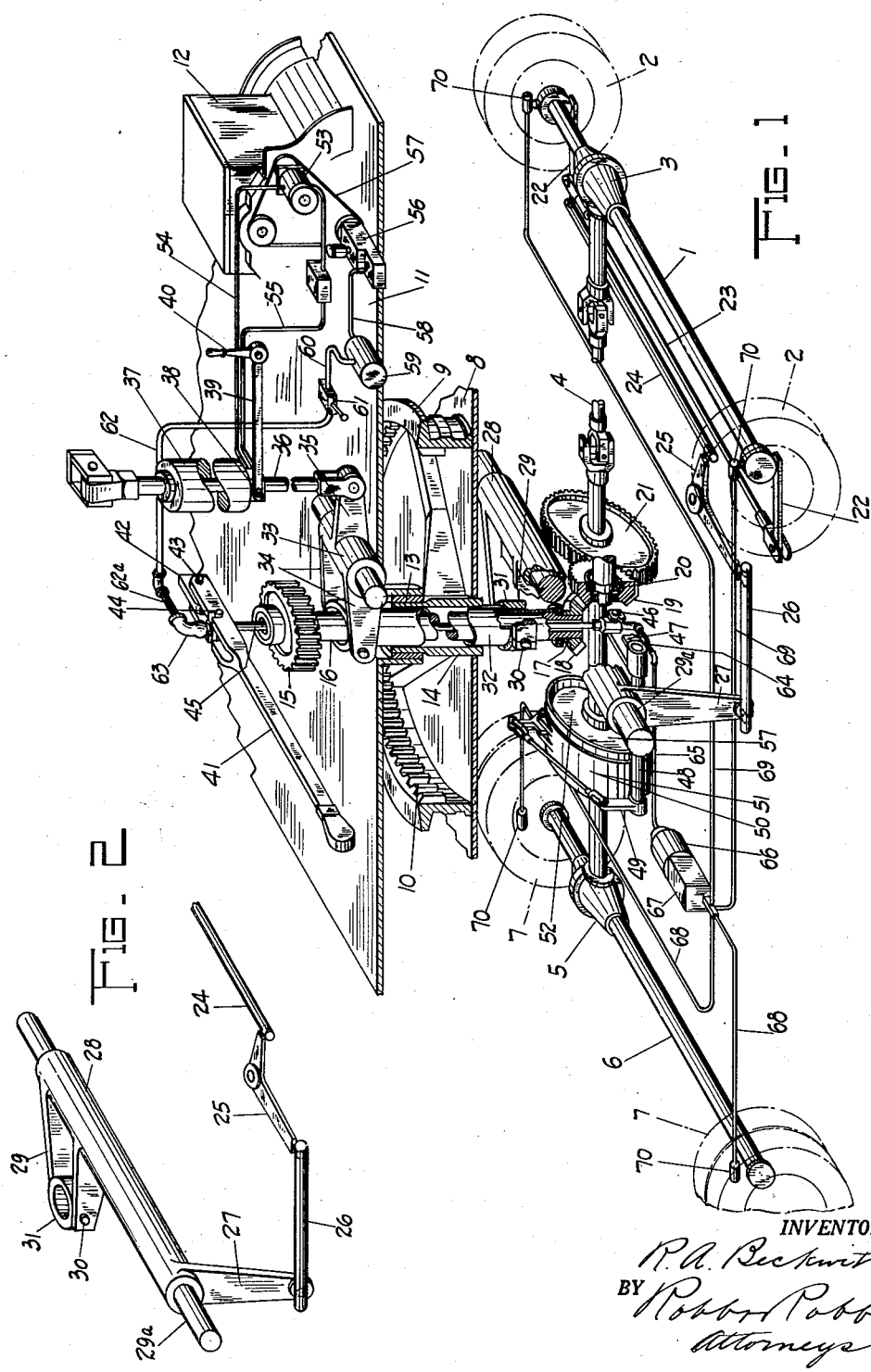
INVENTOR.
R. A. Beckwith
BY Robb Robb
Attorneys Patented Oct. 2, 1951

2,569,445

UNITED STATES PATENT OFFICE 2,569,445

BRAKE CONTROL MECHANISM FOR CRANE TYPE VEHICLES

Raymond A. Beckwith, Milwaukee, Wis., assignor to Koehring Company, Milwaukee, Wis., a corporation Application June 21, 1948, Serial No. 34,264

2 Claims. (Cl. 188—18)

My present invention relates to improved control means for self-propelled machines in which a traction base is utilized to support a rotatable or swing body on which the operator is stationed.

The invention involves novel provisions including instrumentalities operating through the supporting axis of the rotating or swing body whereby to enable actuation of certain steering, braking, and other means, directly carried on the traction base, from control means at the operator's station on the rotative body, irrespective of the relative positions of the base and body.

This invention is especially designed to be used in connection with power shovels, dragline, and clamshell cranes, though it is not necessarily limited to such purposes, as will later become apparent on reference to the following description and annexed drawings.

In the accompanying drawing the Figure 1 illustrates the adaptation of my invention to a self-propelled type of crane such as a power shovel, dragline crane, or clamshell crane, and the view is one partially in perspective as to certain of the parts and partially in section, showing the upper swing body of the machine as mounted upon the ordinary type of wheeled portable base or truck, though crawlers of a conventional type may be substituted for the wheels of the base, one crawler for each pair of wheels at a side of the said base.

Figure 2 is a detail perspective view showing the front wheel steering shaft shifting yoke and collar links and levers, not shown fully in Figure 1 because broken away.

Referring to my drawings, which are somewhat diagrammatic in that various conventional supporting parts for the different operating features of my construction are omitted, it will be noted that the portable base or truck is comprised of a front axle 1 having the front wheels 2 shown by dotted lines and equipped with the common type of differential unit 3 into which leads the forward end of the driving shaft 4. The driving shaft 4 is of any suitable type for effectuating a four-wheel drive of the base or truck of the machine, and extends rearwardly to the differential unit 5 of the rear shaft 6 which is equipped with wheels 7 also shown in dotted lines.

It is contemplated that the frame of the portable base thus far described, and which is not shown in detail because immaterial to the invention, shall support the base platform 8 carrying the ring gear 9 such as ordinarily provided in crane construction of the rotating body type of my invention. The ring 9 is internally toothed at 10 so as to be engaged by what is commonly known as a swing gear mounted on a shaft supported in the rotating body 11 of the crane, said swing gear being operated by suitable shaft and gear connections, not shown, which lead to the power plant or motor 12 which is supported on the swing body or superstructure platform 11 of the machine. The swing body 11 is suitably journalled at 13 for rotation on a vertical trunnion 14 supported on the truck platform 8, whereby the body 11 may rotate a full revolution or less relatively to the platform 8 under the action of the ring gear previously referred to and itself not shown, said ring gear coacting with the ring gear 9 previously referred to.

In shovel or crane type machines involving my invention, the ring gear 9 is flanged at its upper portion and the rotating body or platform 11 is equipped with rollers bracketed thereto and which may operate in engagement with the underside of the top flange of the gear 9 so as to maintain the rotating or swing body of the machine stable during its rotary movements.

The foregoing generally sets forth the type of construction of a machine in conjunction with which the control features of my invention may be used.

Proceeding to describe the operating features of my machine, which are actuated largely from the rotating body 11, I first refer to the means for driving the wheels 2 and 7 from the motor 12. Said means includes a driving gear 15 mounted at the center rotating axis of the body 11 upon the vertical traction shaft 16. The gear 15 is designed to be driven by any of the usual gear instrumentalities employed for such purposes commonly at the present time and suitably connected up to the motor to be actuated thereby. The shaft 16 extends downwardly through the center trunnion 14 previously referred to as carried by the base platform 8 and the lower end of said shaft 16 is reduced in diameter as shown at 17 and equipped with a driving bevel gear 18 which meshes with a double gear on the longitudinal drive shaft 4 previously referred to. This double gear comprises a bevel pinion 19 and a spur pinion 20, the spur pinion engaging with a gear 21 keyed to the shaft 4 and the bevel pinion meshing with the bevel pinion 18 keyed or otherwise secured for rotation to the shaft 16. From the foregoing it will be had in mind, therefore, that the driving of the traction wheels 2 and 7 may be effected by the operation of the gears and shaft means just set forth, the gear 15 of course being driven in some suitable manner from the motor 12.

I next refer to the instrumentalities employed for controlling the steering of the machine by shifting of the front wheels 2 or turning in a proper direction dependent upon the direction in which the machine is to be moved. The front wheels are equipped with suitable steering arms 22 connected by the customary drag link 23 and said drag link is operable by the transverse actuating rod 24 connected thereto in a conventional manner, said rod 24 being shiftable by a bell crank 25, all of which parts are suitably supported on the truck or portable base of the machine. The rod 24 is connected to one arm of the crank lever 25 and a shifting rod 26 is connected to the other arm of said lever at one end of the rod 26, the opposite end of the rod 26 being attached pivotally to a rocker arm 27 which is mounted upon a rock shaft 28 of sleeve like form supported by a rock shaft 29a carried by any suitable support, not shown, on the frame or chassis of the portable base or truck. Extending rearwardly from the rock shaft 28 is a yoke like member 29 having pivotal connection at its rear end portion as at 30 with an operating or shifting collar 31. The shifting collar 31 is connected to a shifting sleeve shaft 32 which surrounds the shaft 16 and also extends upwardly through the trunnion 14 to a point above the swing body 11, where said sleeve shaft 32 is connected to the rear end of a tiltable lever 33. The lever 33 is pivotally mounted on any suitable support, not shown, carried by the platform 11, and the rear arms 34 of the lever 33 are directly attached to the sleeve shaft 32, whereas the front single arm 35 of the lever 33 is connected to a pressure medium operated actuating rod 36. The rod 36 is attached to the piston of a hydraulic steering unit 37 which includes a cylinder for receiving a suitable pressure fluid or liquid to actuate such piston, not shown. At the lower end of the unit 37 a valve 38 is provided and is operable by a rod 39 connecting said valve to the steering lever 40 located on and above the locating body 11 and supported by any suitable and substantial bracket means adjacent to the operator's station on said rotating body. By control movements of the valve 38 through the lever 40 the pressure medium in the unit 37 will be caused to act to move the rod 36 upwardly or downwardly to tilt the lever 33. When the arms 34 of lever 33 are tilted downwardly, the sleeve shaft 32 will be moved downwardly, and, by reason of its connection to the yoke means 29 will rock the transverse sleeve shaft 28 in a downward manner thereby to cause a forward rocking action of the rocker arm 27 that is connected directly with the steering means bell crank lever 25. This action will effect a rocking of the lever 25 and shift the wheels 2 to turn in one direction. The turning of the wheels 2 in an opposite direction will be effected, of course, by a reverse movement of the shifting rod 36 incident to supplying motive fluid to the unit 37 under control of the valve 38 in a self-evident manner.

I next refer to the parking or emergency brake means employed for the machine, the same including mechanically operated devices located on the traction or portable base and on the swing body 11 referred to. The emergency brake mechanism comprises a hand lever 41 located on the swing body 11 and supported by any suitable and substantial support, including the pivotal supporting member 42 connected with the body 11 in a suitable manner. The lever 41 pivots on the support 42 by a pivot 43 and said lever has a handle at the end thereof opposite the pivot 43, while intermediate its end it has a cross pin connection 44 with the upper end of a tubular brake rod 45. The brake rod 45 passes downwardly through the members 14, 16, and 32 at the pivot axis of the swing body 11, or trunnion means previously referred to, and said rod 45 is connected at its lower end by pivot means 46 to a rocker arm 47 on a short shaft 48 extending longitudinally of the chasis or frame of the base of the machine and carried by any suitable bearing means on said base, not shown. The shaft 48 has an arm 49 connected by a rod 50 to the brake band 51. The brake band 51 cooperates with the brake drum 52 which is mounted in any rigid manner for rotation with the propeller shaft 4 previously mentioned.

Operation of the hand lever 41 in opposite directions will effect application of the emergency or parking brake 51, and release thereof, as desired.

I next refer to the regular brake mechanism utilized in connection with my machine, by which braking effects may be applied or released in respect to all of the traction wheels 2 and 7 of the machine. Whereas a hydraulic pressure medium may be supplied to the unit 37 by the pump 53 operated from the motor 12 associated therewith, through pressure and exhaust lines 54 and 55, respectively, I may avail of an air pressure medium for actuation of the regular working brake means now to be described. To this end there is associated also with the motor 12 an air pump 56 driven by the same belt means 57 which drives the hydraulic pump 53. From the pump 56 an air line 58 leads to an air tank 59. From the tank 59 an air line 60 leads to an air valve 61. From the air valve 61 the air line 62 leads to the flexible air line section 62a that connects, by means of a union 63, with the tubular portion of the tubular emergency brake operating rod 45. For the purposes of my regular system, I therefore use the rod 45 as a conduit for brake fluid pressure medium, while for my emergency brake system I utilize the said tubular rod 45 as a mechanical shifting rod. Air passing from the air line 62 and 62a enters the tubular portion of the rod 45 and passes from the lower end of said rod through a flexible conduit section 64 to the air pipe 65 for entering the air cylinder 66. The parts 64, 65 and 66 are mounted on the truck or portable base of my machine as distinguished from the other parts of my other brake system previously described which are mounted upon the swing body of the machine, except the tubular rod 45 which is mounted in part upon the base and in part upon the body since it is carried directly in the axis means by which the swing body is mounted on the base. Air admitted to the cylinder 66 under the control of the air valve 61 at the operator's station is adapted to act upon the piston of the master brake cylinder 67 which includes an hydraulic power cluster unit with which the brake fluid pipes 68 leading to the rear wheel brake cylinders, and the front wheel brake pipes 69 leading to the brake cylinders of the front wheels 2, are connected.

It will be obvious from the foregoing that when air is admitted to the cylinder 66 under control of the valve 61 having a suitable manual control lever, the pressure medium may be caused to operate the unit 67 and simultaneously apply the brakes at the front wheels 2 and rear wheels 7 of the base of the machine. The unit 67 may be a conventional type of hydraulic unit having a master brake cylinder and piston therein for acting upon a hydraulic pressure medium, such as oil, in the system of parts 67, 68, 69 and the various cylinders 70 at the brakes of the front and rear wheels.

From the foregoing it will be seen that by arranging the various control levers and valves for operating the steering mechanism of the machine, and the emergency and regular brake devices for the portable or traction base at the operator's station on the rotating body 11 of my machine, these instrumentalities will be readily accessible to the operator while at his operator's station for controlling practically all of the operations of the various mechanisms which I have described above. The central hollow axis of connection between the rotating body 11 and the traction base is utilized, practically speaking, for carrying through from the said body to the base various of the controlling and operating features required, so that no matter in what position the swing body is located in the general operation of my machine, the said various mechanisms on the traction base may be effectively actuated.

Having thus described my invention, what I claim as new and desire to secure by Letters Patent of the United States, is:

1. In a rotatable swing body type of vehicle having a traction base supported by traction wheels and a hollow center trunnion forming the rotating connection between the base and body, a tubular rod extending through the said trunnion and projecting upwardly above the body and downwardly into the traction base, first brake operating means for braking wheels of the traction base operably connected to the said rod at its lower end, means on the body for imparting movement to the rod for actuating the said brake means, second brake operating means for the traction wheels carried by the traction base including fluid operated devices, a source of supply of pressure fluid on the body, and means for passing pressure fluid from said supply source through said tubular rod from the body to the said fluid operated devices for controlling the action of said devices.

2. A vehicle as claimed in claim 1, combined with a flexible conduit connecting the source of fluid supply and the upper end of the tubular rod, and another flexible conduit connecting the lower end of the tubular rod with the second brake operating means.

RAYMOND A. BECKWITH.

REFERENCES CITED

The following references are of record in the file of this patent:

UNITED STATES PATENTS

| Number | Name | Date |
|---|---|---|
| 1,799,495 | Bendix | Apr. 7, 1931 |
| 2,083,460 | Ljunkull | June 8, 1937 |
| 2,266,651 | McLean | Dec. 16, 1941 |
| 2,343,800 | Rauch | Mar. 7, 1944 |
| 2,380,619 | Terrill | July 31, 1945 |